United States Patent [19]
Berry

[11] 3,828,988
[45] Aug. 13, 1974

[54] TANK FOR BULK TRANSPORT AND STORAGE OF SEMISOLID MATERIALS

[75] Inventor: George R. Berry, Wood River, Ill.

[73] Assignee: Bervy Inc., Bethalto, Ill.

[22] Filed: Apr. 4, 1973

[21] Appl. No.: 347,845

[52] U.S. Cl. .............................................. 222/389
[51] Int. Cl. ............................................. B67d 5/06
[58] Field of Search................... 222/389, 386, 309;
308/190, 216, 4 A, 4 R, 196, 195, 6 A, 197,
184 R, 6 R, 6 B; 220/22, 22.1, 93

[56] References Cited
UNITED STATES PATENTS

| | | | |
|---|---|---|---|
| 1,517,027 | 11/1924 | Smith................... | 308/6 A |
| 2,058,331 | 10/1936 | Long................... | 308/6 A X |
| 2,430,718 | 11/1947 | Jacobson............ | 222/386 |
| 2,931,477 | 4/1960 | Metzgar.............. | 308/6 R UX |
| 3,212,833 | 10/1965 | Sloan et al.......... | 308/195 |
| 3,405,845 | 10/1968 | Cook et al........... | 222/389 X |
| 3,556,042 | 1/1971 | Laughlin.............. | 308/4 A X |
| 3,612,359 | 10/1971 | Sundholm........... | 222/386 X |

FOREIGN PATENTS OR APPLICATIONS

| | | | |
|---|---|---|---|
| 852,299 | 10/1960 | Great Britain...................... | 222/389 |
| 1,031,738 | 6/1958 | Germany............................ | 222/389 |

Primary Examiner—Robert B. Reeves
Assistant Examiner—Charles A. Marmor
Attorney, Agent, or Firm—Koenig, Senniger, Powers and Leavitt

[57] ABSTRACT

A tank for the transport or storage in bulk of semisolid materials, such as lubricating grease, lard, butter or the like, the tank having an outlet at one end thereof, and a piston movable longitudinally within the tank from one end thereof to the other. The piston is forced toward the outlet by compressed air introduced into the tank behind the piston for pressurizing the semisolid material and forcing it toward the outlet. Flexible seals extending beyond the periphery of the piston scrape the semisolid material from the inner tank surface and seal the piston relative to the tank. Two circumferential rows of ball rollers extend around the periphery of the piston and are spaced longitudinally from one another on the piston. The balls are resiliently mounted on the piston so as to prevent canting of the piston in the tank, to hold the balls in engagement with the internal surface of the tank, and to accommodate changes in the internal cross-section of the tank within a limited range as the piston moves longitudinally within the tank.

18 Claims, 9 Drawing Figures

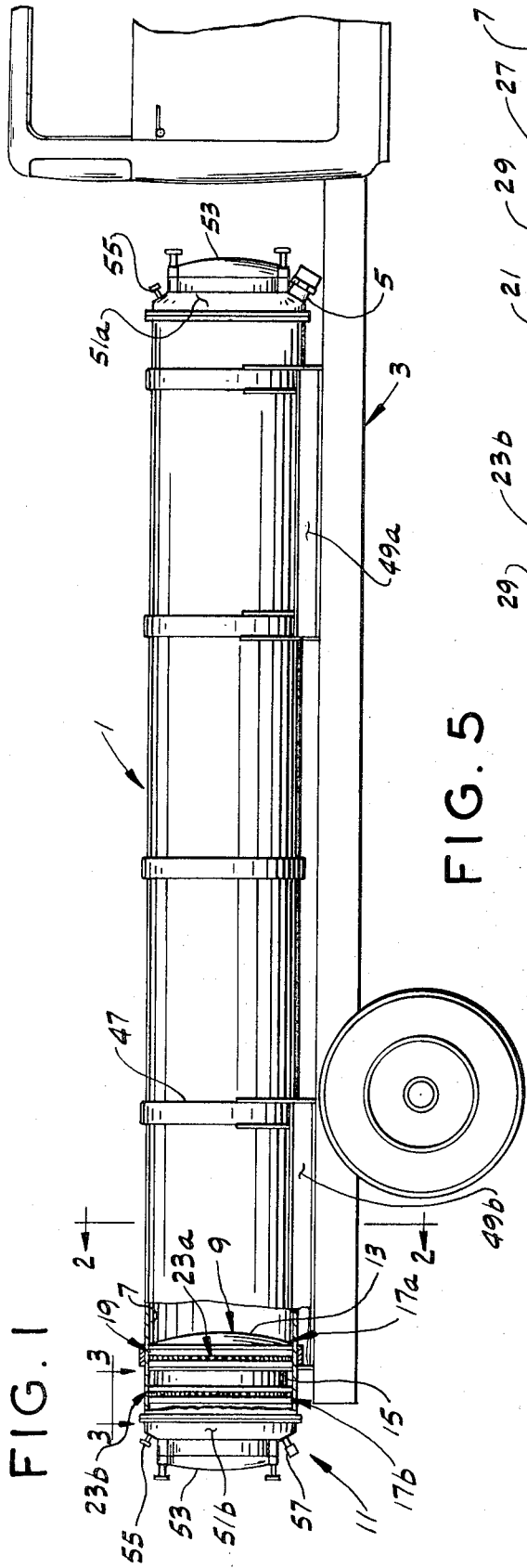
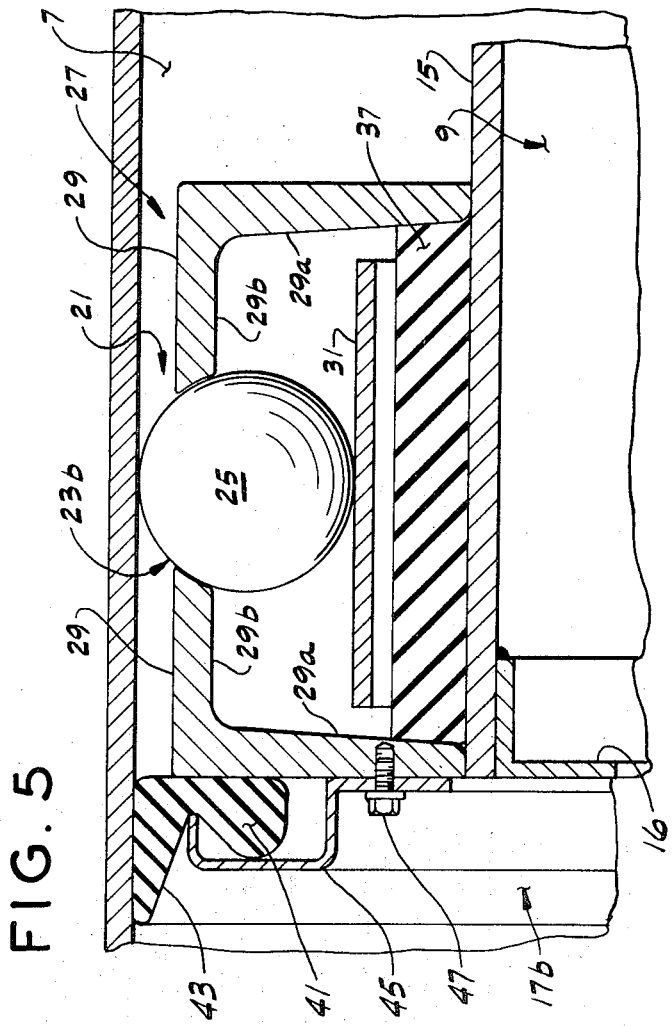

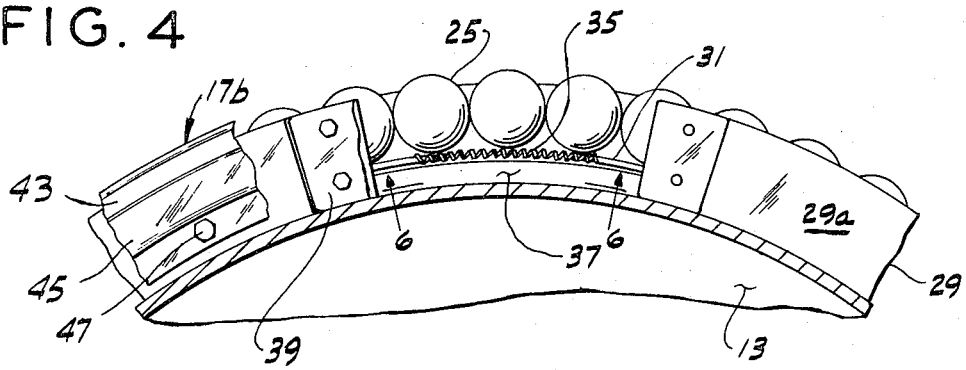
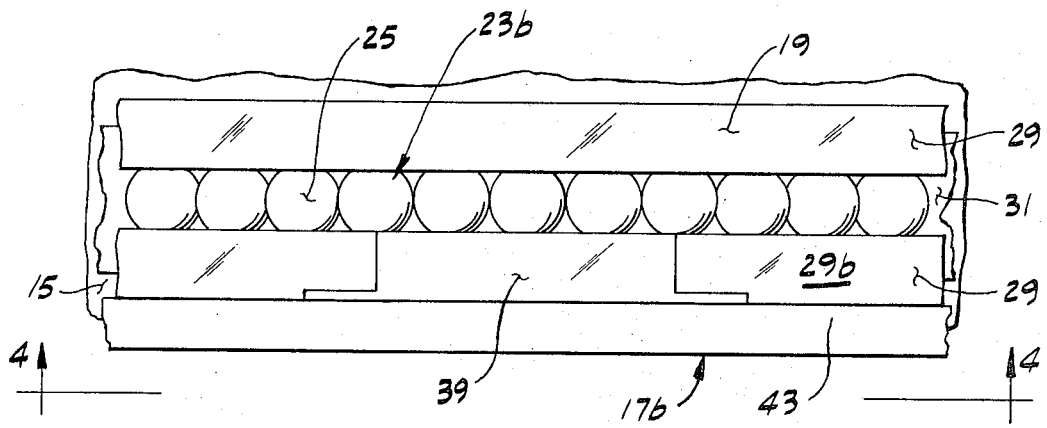
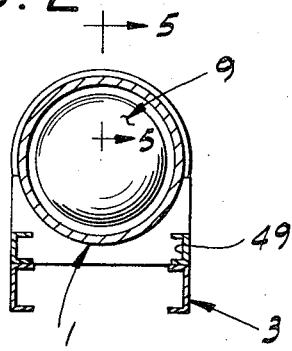

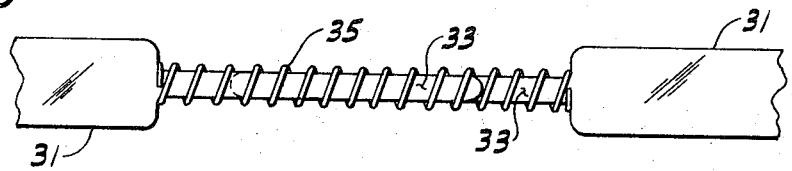
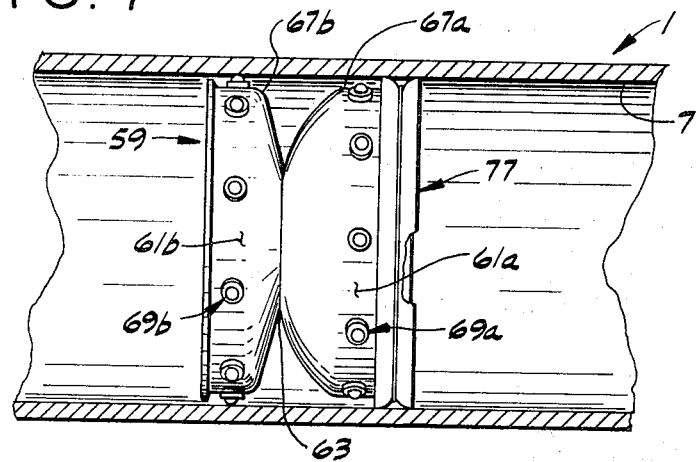
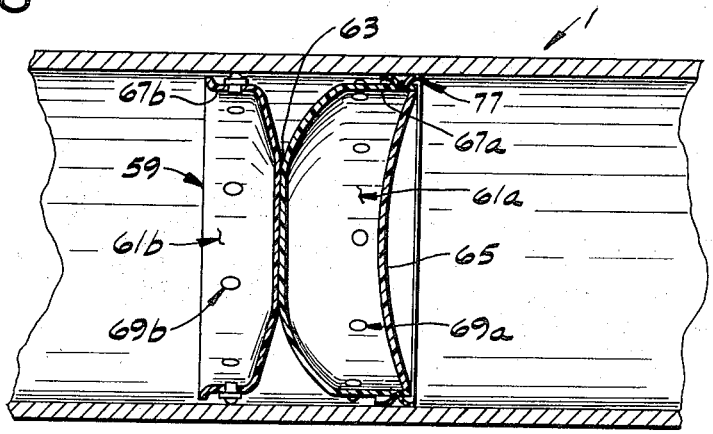
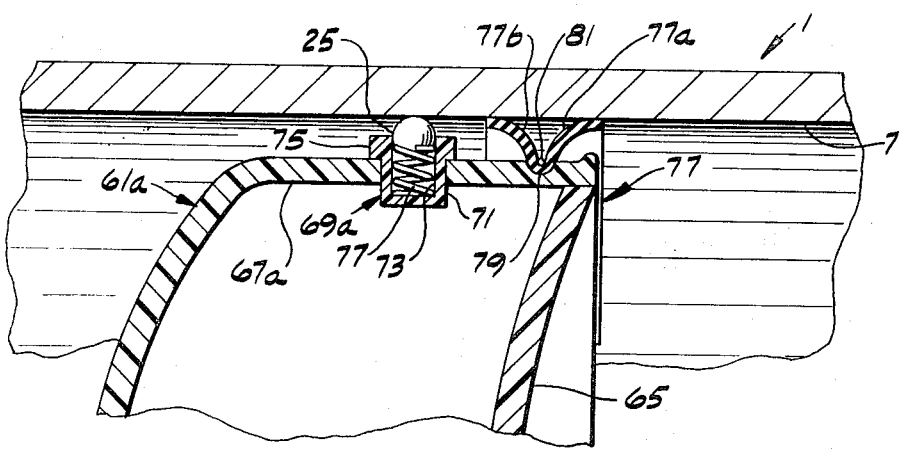

TANK FOR BULK TRANSPORT AND STORAGE OF SEMISOLID MATERIALS

BACKGROUND OF THE INVENTION

This invention relates to a system for transporting or for storing semisolid materials, such as lubricating grease, lard, butter, or the like, in bulk quantities, and is especially concerned with a tank adapted quickly and efficiently unload the semisolid material contained therein.

Generally, bulk semisolid material is unloaded from a tank by a pump connected to an outlet at the bottom of the tank. Due to the high viscosity of the semisolid material, voids tend to form at the tank outlet and the pump loses its prime. To overcome this difficulty, the tank is frequently heated to reduce the viscosity of the semisolid material to allow it to flow toward the outlet. In some instances, however, the semisolid material may be damaged by local overheating. To summplement heating, workmen sometimes open the tank and manually push the semisolid material toward the outlet with paddles. This, however, is a messy and time-consuming job resulting in increased labor costs. It is also known that air pressure and air bags have been utilized in an attempt to force the semisolid material toward the outelt, but this resulted in more air pockets being formed in the semisolid material. Augers at the bottom of the tank also have been used to feed the semisolid material to the outlet, but voids formed above the auger necessitating that workmen manually push the semisolid material into the auger. Reference may be made to such U.S. Pat. Nos. as 1,764,968, 1,764,970 and 1,182,519 illustrating prior grease dispensing and liquid transporting and storage systems.

SUMMARY OF THE INVENTION

Among the several objects of this invention may be noted the provision of a tank for transport or storage in bulk of semisolid materials in which the semisolid material may be rapidly and efficiently unloaded from the tank without damage to the semisolid material and with a minimum of labor costs; the provision of such a tank in which the internal cross-section of the tank may vary within a limited range and yet not prevent substantially complete unloading of the semisolid material; and the provision of such a tank which is of economical construction and which may be easily operated by persons without special training. Other objects and features of this invention will be in part apparent and in part pointed out here and after.

Briefly, this invention relates to an elongate tank for transport or for storage in bulk of semisolid materials, such as grease. This tank has an outlet for the semisolid material contained therein at one end thereof, and is of generally constant internal cross-section throughout its length and has a follower movable longitudinally therewithin. Means are provided for effecting application of force to the follower in the direction toward the outlet and for pressuring the semisolid material in the tank to force it toward the outlet. This follower comprises a piston of smaller cross-section than the internal cross-section of the tank. The piston carries flexible sealing means which extend out beyond the periphery of the piston and which are in sliding engagement with the internal surface of the tank for scraping the semisolid material from the internal surface of the tank and for sealing the piston relative to the tank as the piston moves longitudinally therewithin toward the outlet. Means are also provided for holding the piston against canting in the tank comprising at least two rows antifriction bearing means carried by the piston engageable with the internal surface of the tank around the periphery of the piston, these bearing means being spaced apart longitudinally of the piston. Means mounting the bearing means are provided for accommodating changes in the internal cross-section of the tank within a limited range.

BRIEF DESCRIPTION OF THE DRAWINGS

FIG. 1 is a side elevation view of a tank of this invention mounted on a truck with a portion of the tank broken away showing a piston movable within the tank to force a semisolid material in the tank toward a tank outlet;

FIG. 2 (sheet 2) is a vertical transverse section on line 2—2 of FIG. 1;

FIG. 3 is an enlarged view taken on line 3—3 of FIG. 1 of a portion of the piston periphery;

FIG. 4 is a view on line 4—4 of FIG. 3 with parts broken away;

FIG. 5 (sheet 1) is an enlarged partial vertical section on line 5—5 of FIG. 2 illustrating the rear portion of the position;

FIG. 6 (sheet 3) is a view on line 6—6 of FIG. 4 with parts omitted for clarity;

FIG. 7 is an enlarged partial longitudinal cross-section of the tank showing a modification of the piston;

FIG. 8 is a longitudinal cross-section of the piston of FIG. 7; and

FIG. 9 is an enlarged view of a portion of the piston illustrated in FIG. 8.

Corresponding reference characters indicate corresponding parts throughout the several views of the drawings.

BRIEF DESCRIPTION OF THE PREFERRED EMBODIMENTS

Referring to the drawings, an elongate tank of this invention generally indicated at 1 is shown mounted on a transport vehicle 3 (e.g., a truck) for the transport in bulk of semisolid materials, such as lubricating grease, lard, butter and other similar materials. The tank has a combination inlet and outlet fitting at 5 at its forward end for filling and emptying the tank with semisolid material. A pump (not shown), for example a gear pump, is connected to the outlet fitting to pump the semisolid material into and out of the tank.

Tank 1 is of substantially constant circular internal cross-section throughout its length. It will be understood, however, that the present invention may be used in conjunction with tanks of various constant cross-sections, such as elliptical or polygonal. The internal surface of the tank is indicated at 7. A follower or piston generally indicated at 9 is provided in the tank and is movable longitudinally therewithin from one end of the tank to the other for forcing the semisolid material in the tank toward outlet fitting 5 in a manner as will appear. The piston is of smaller cross-section (diameter) than the internal cross-section (diameter) of the tank. The tank includes means generally indicated at 11 for effecting application of force to the piston in the direction toward the outlet fitting and for pressurizing the semisolid material in the tank so as to force it toward the outlet fitting and to expel it therefrom. Means 11 is shown as an inlet at the rear end of the tank for introducing compressed air to the space within the tank behind the piston, but it will be understood that other suitable means, such as a hydraulic cylinder, a pulley and cable arrangement, or a power screw, may be utilized for biasing the piston toward the outlet.

As is in FIG. 1, piston 9 has a convex forward end 13 acting against the semisolid material and an elongate peripheral wall 15 (also referred to as the periphery of the piston) extending back from the convex end. As shown in FIG. 5, an internal circumferential ring 16 of angle-shaped cross-section is provided for stiffening the rear portion of the piston peripheral wall. The piston has sealing means constituted by flexible seals 17a, 17b at the front and rear portions, respectively, of its peripheral wall. These seals extend out beyond the periphery of the piston and are in sliding, sealed engagement with the internal tank wall or surface 7 (see FIG. 5) for sealing the piston relative to the tank and for scraping the semisolid material from the internal tank wall as the piston moves forwardly therewithin.

As generally indicated at 19, means is provided for holding piston 9 against canting in the tank as it moves longitudinally therwithin. This means comprises antifriction bearing means 21 (see FIGS. 3-5) carried on the peripheral wall 15 of the piston engagable with internal surface 7 of the tank. These antifriction bearings are spaced from one another longitudinally of the piston and are shown to comprise two circumferential rows 23a, 23b of balls 25 held in position on peripheral wall 15 for accommodating changes in the internal diameter or cross-section of tank 1 within a limited range as the piston moves longitudinally within the tank. Row 23a, constituting a front row of balls, is located adjacent to the convex face 13 of the piston, and row 23b, constituting a rear row of balls, is located adjacent the rear portion of the piston. Typically, with piston 9 having an inside diameter of about 27 inches, the rows of balls 23a, 23b are spaced longitudinally apart from one another and the periphery of the piston about 8 to 12 inches, and the balls are each about 1-½ inches in diameter. A retainer generally indicated at 27 is provided on peripheral wall 15 of the piston for mounting each row 23a or 23b of balls 25 on the piston and for holding the balls captive in side-by-side relation in their respective rows with the outermost position of each of the balls exposed for engagement with the internal tank surface 7.

More particularly, retainer 27 for each row 23a, 23b of balls includes a pair of retaining rings 29 secured to peripheral walls 15 of piston 9 on opposite sides of the balls of a respective row. As shown in FIG. 5, each ring member is angle-shaped in cross-section with what amounts to a vertical leg 29a secured to the periphery of the piston, as by welding, and extending radially outwardly of the piston and having a second leg 29b at the outer end of the radial leg extending inwardly toward the row of balls. The inner edges of the legs 29b of the ring members constitute retainers which are spaced apart from one another a distance sufficient to allow a portion of each of the balls 25 to extend therebetween, but prevents the balls from passing therethrough. Thus, the balls are held captive in their respective rows by the retainer.

Each retainer 27 further includes a resilient race 31 in engagement with the innermost portion of each ball 25 in its respective rows 23a or 23b. This race is shown to be a band of spring steel or the like and is expandable and contractible in response to changes in the internal cross-section of tank 1 as the piston moves longitudinally therewithin. This expansion and contraction of the race maintains the balls in engagement with the inside surface 7 of the tank and holds the piston against canting in the tank. Race or band 31 extends around the periphery of the piston and has its ends adjacent one another. As shown in FIG. 6, each end of the band has a finger 33 of narrower width than the band extending endwise therefrom with the fingers overlapping one another. A coil compression spring 35 is interposed between the ends of the bands surrounding fingers 35. This spring biases the ends of the band apart from one another so as to permit the band to expand and contract as the balls bearing against the race and the internal tank surface encounter changes in the internal cross-section of the tank and so as to maintain the balls in contact with the internal surface of the tank so as to prevent canting of the piston. Typically, for a tank of about 30 inches in diameter, race 33 can accommodate variations in tank diameter of about ⅛ inch. A compressible and resilient backup member 37 of hard rubber or the like is adhered to the outer surface of peripheral wall 15 such that it is disposed between the peripheral wall and the back face of band 31. The band is engagable locally with the backup member when a ball (or a plurality of balls) is forced inwardly due to a decrease in the internal diameter of the tank. In the event the piston begins to cant in the tank, certain of the balls are forced inward causing the race locally to bear against the backup member and thus hold the piston against canting. As shown in FIGS. 3 and 4, one of the ring members 29 of each retainer 27 has a removable section 39 for inserting balls 25 between rings 29.

Seal 17a at the forward end of piston 9 acts as a scraper to scrape the semi-solid material from the internal tank wall 7 and further acts as a seal to prevent grease from leaking past the piston as the piston moves forwardly within the tank. Seal 17b at the rear of the piston seals the piston relative to the tank and prevents the compressed air introduced into the tank behind the piston from leaking past the piston. Seal 17a is a mirror image of seal 17b, and for that reason only rear seal 17b will be described in detail. As shown in FIG. 5, seal 17b is a cup seal having an inner mounting portion 41 and a tapered outer sealing lip 43. The mounting portion is adapted to be removably secured to the outer face of leg 29a of the outermost retaining ring at the rear of the piston by a hold down ring 45. It will be understood that seal 17a at the forward end of the piston is removably secured to the outer face of the forwardmost retaining ring in a similar manner. This hold down ring 45 is shown to be secured to its respective retainer ring by bolts 47. The seal is formed of a resilient, elastic material, such as neoprene rubber, with the lip extending generally radially outwardly of the mounting portion such that when the piston is installed within the tank, the lip is folded inwardly from its as-formed-position thereby to resiliently engage the inner surface of the tank. Seal 17a faces forwardly within the tank and seal 17b faces rearwardly. Lip 43 of each seal is sufficiently flexible to remain in sealing and scraping engagement with the inner surface of the tank as the piston moves longitudinally therewithin and as it encounters variations in the internal diameter of the tank within the above stated limited range.

More particularly, tank 1 is shown in FIG. 1 to be an elongate cylindrical tank having circumferential stiffeners 47 spaced at intervals along its length. Front and rear cradles 49a, 49b, respectively, provide a mounting for the tank on the chassis of truck 3. The tank has flanged outer ends for removably securing tank heads 51a, 51b to the front and rear ends of the tank, respectively. Each tank head includes a removable cover 53 for providing access to the interior of the tank and a pressure relief device 55 to relieve pressure from within the tank if it exceeds a predetermined value. More specifically, relief device 55 is a relief or pop valve set to relieve pressure from within the tank if the pressure exceeds 10 psig. Outlet fitting 5 is shown to be included in the front head 51a, and a compressed air fitting 57 is included in head 51b to which an air hose (not shown) from a compressed air source may be connected to introduce compressed air into the tank behind piston 9. This fitting together with the compressed air source constitutes means 11 for biasing the piston toward the front of the tank and toward outlet 5 to pressurize the semisolid material and to force it toward the outlet. The compressed air source is regulated to supply air at a pressure substantially below the above stated predetermined pressure (10 psig) at which relief valve 55 on head 51b is set to relieve. For example, the pressure introduced into the tank via fitting 57 is regulated to 5 psig or less.

Operation is as follows: With tank 1 filled with semisolid material, with piston 9 at its rearward starting position (shown in FIG. 1), and with outlet 5 connected to the inlet of a pump (not shown), compressed air is introduced into the tank via fitting 57 thereby to bias the piston toward the front of the tank and to pressurize the semisolid material. This causes the material to be pushed toward the tank outlet. As the material flows from the tank, piston 9 moves longitudinally therewithin toward the outlet to maintain pressure on the semisolid material and to evenly move the material toward the outlet. Thus it can be seen that the semisolid is positively and evenly fed to the outlet thereby preventing a void from forming at the outlet, and that the semisolid material is emptied from the tank rapidly, with little or no manual labor required and with no damage to the material.

A modification of piston 9 is illustrated in FIGS. 7–9, this modified piston being designated 59 to distinguish it from piston 9. Piston 59 comprises a cup-shaped front portion 61a and a cup-shaped rear portion 61b joined together in back-to-back relation, as indicated at 63. The front portion has a concave front plate 65 for contact with the semisolid material as the piston moves longitudinally within the tank toward outlet 5. Preferably, these front and rear portions and concave plate 65 are molded of fiber-reinforced plastic and are thus light weight and somewhat more relilient than metal pistons.

Each of the cup-shaped piston portions 61a, 61b has a peripheral or side wall 67a, 67b respectively, and each peripheral wall carries a circumferential row of antifriction bearing assemblies 69a, 69b, respectively. As shown in FIG. 9, these rows are spaced longitudinally of one another on the piston in a manner similar to the antifriction bearing means 21 heretofore described, and each bearing assembly comprises a holder 71 adapted to be inserted in a hole through the peripheral wall of its respective piston section. Holder 71 is shown to have a blind hole 73 therein and a shoulder 75 adapted to bear against the outer surface of the piston peripheral wall. A compression coil spring 77 and a ball 25 are received by the holder in hole 73 with the spring biasing the ball outwardly for engagement with the inner surface 7 of the tank. These holders correspond generally to retainers 27 heretofore described. It will be noted that substantially fewer balls 25 are included in each row 69a, 69b of piston 59 than are included in rows 23a, 23b of piston 9. Holders 71 permit in-and-out movement of their respective balls 25 such that rows 69a, 69b can accommodate changes in diameter of tank 1 of about ±0.25 inches. Springs 77 resiliently maintain the balls in engagement with the internal tank wall 7 so as to prevent canting of the piston relative to the tank, and yet permit the balls freely to rotate in the holders as the piston moves longitudinally within the tank.

A combination air-grease seal 77 is carried by front portion 61a, thereby to seal the piston relative to the tank so as to prevent the leakage of either compressed air or grease past the seal and to scrape the semisolid material from the inside tank surface 7 as the piston moves longitudinally within the tank. This combination seal comprises a continuous band of resilient, flexible material (i.e., Neoprene rubber or the like), extending circumferentially around the piston. A circumferential groove 79 is provided in the forward portion of peripheral wall 67a of the front piston section adjacent its forward end. As is best shown in FIG. 9, the midportion of the band of sealing material is placed around the piston in such manner that the center of the band overlies the groove. The band is drawn down into the groove by means of a retaining wire 81 which is drawn taut about the circumference of the piston, thereby to force the front and rear portions 77a, 77b, respectively, of the band of sealing material 77 generally outwardly from the periphery of the piston so that the seal is generally V-shaped in cross section (see FIG. 9). Upon installation of the piston in the tank, the front and rear portions of the seal are folded over by tank wall 7 to constitute resilient cup seals in sealing and scraping engagement with the inner surface tank wall. The front portion 77a of this seal corresponds to seal 17a of piston 9 and serves to seal the piston relative to the tank so as to prevent the leakage of grease past the seal and to scrape the grease from the inner surface of the tank wall, and rear portion 77b corresponds generally to seal 17b of piston 9 and serves to seal the piston relative to the tank to prevent the leakage of compressed air therepast.

Operation of tank 1 with piston 59 installed therein is substantially the same as the operation of piston 9 and need not be again described in detail.

It will be understood that tank 1 need not be mounted on a vehicle for transport and that tank 1 may be disposed vertically with its outlet 5 at its bottom and with piston 9 (or 59) movable vertically within the tank to positively force the semisolid material toward the outlet.

In view of the above, it will be seen that the several objects of the invention are achieved and other advantageous results attained.

As various changes could be made in the above constructions without departing from the scope of the in-

What is claimed is:

1. In an elongate tank for transport or for storage in bulk of semisolid material, such as grease, said tank having an outlet for the semisolid material contained therein at one end thereof, said tank being of generally constant internal cross section throughout its length; a follower movable longitudinally in the tank, means for effecting application of force to the follower in the direction toward the outlet and for pressurizing said semisolid material in the tank to force it toward the outlet, said follower comprising a piston of smaller cross section than the internal cross section of the tank, flexible sealing means carried by the piston and extending out beyond the periphery of the piston and in sliding engagement with the internal surface of the tank for scraping the semisolid material from the internal surface of the tank and for sealing the piston relative to the tank as the piston moves longitudinally therewithin, means for holding said piston against canting in the tank comprising at least two antifriction bearing means carried by the piston engageable with the internal surface of the tank around the periphery of the piston to permit said piston to freely move within said tank, said bearing means being spaced apart longitudinally of the piston, and means resiliently mounting said bearing means for accommodating increases and decreases in the internal cross section of the tank within a limited range 2. In a tank as set forth in claim 1, said means for effecting application force to the follower means comprising an air inlet at the end of the tank opposite said outlet for delivery of compressed air to the tank behind the piston to move it in the direction toward the outlet.

3. In a tank as set forth in claim 1, said antifriction bearing means comprising a plurality of elements in rolling contact with the internal surface of the tank.

4. In a tank as set forth in claim 3, said rolling elements being spherical balls arranged in two circumferential rows around the periphery of the piston, said rows being spaced longitudinally of the piston from one another on the periphery of the piston a distance sufficient to prevent canting of the piston.

5. In a tank as set forth in claim 4, said mounting means comprising a retainer for holding a series of said balls in a row with the outermost portion of each ball being in engagement with the internal surface of the tank and a resilient race in engagement with the innermost portion of each ball in said row, said race being expandable and contractable in response to changes in internal cross section of the tank as the piston moves longitudinally within the tank to maintain said balls in rolling contact with the internal surface of the tank and to hold the piston against canting in the tank.

6. In a tank as set forth in claim 5, said race comprising an elongate band of resilient material extending around the periphery of the piston and having its ends adjacent one another and having its outer surface in engagement with the innermost portion of each of said balls in its respective row, and spring means interposed between said adjacent band ends biasing them apart from one another so as to permit the band to expand and contract in response to said balls encountering a change in the internal cross section of the tank within said limited range as the piston moves longitudinally therewithin for maintaining the balls in engagement with the internal surface of the tank.

7. In a tank as set forth in claim 6, said mounting means further comprising a compressible and resilient back-up member on the periphery of said piston between the piston and said band, the latter being engageable with the back-up member for holding said piston against canting in the tank.

8. In a tank as set forth in claim 2, said sealing means comprising a front seal adjacent one end of the piston constituting its forward end having a lip in engagement with the internal tank surface for scraping the semisolid material therefrom as the piston moves toward the outlet, and a rear seal adjacent the other end of the piston constituting its rearward end having a lip in engagement with the internal surface of the tank for sealing said compressed air within the tank behind the piston as the piston moves longitudinally within the tank toward said outlet.

9. In a tank as set forth in claim 8, each of said seals being resilient and having a mounting portion secured to said piston with said lip extending outwardly therefrom for sliding sealing engagement with the internal tank surface as said piston moves within the tank.

10. In a tank as set forth in claim 2, said sealing means comprising a seal adjacent one end of the piston constituting its forward end and having a first lip in engagement with the internal tank surface for scraping the semisolid material therefrom as the piston moves toward said outlet, and a second lip in engagement with the internal surface of the tank for sealing the compressed air within the tank behind the second lip as the piston moves within the tank toward said outlet, said seal being generally V-shaped in cross section with one portion of said V-shaped cross section constituting said first lip and with the outer portion of said V-shaped cross section constituting said second lip, said piston having a circumferential groove in its periphery adjacent its one said end, said V-shaped seal comprising a band of resilient material extending around the circumference of the piston and overlying said groove, the mid-portion of said band being drawn down into said groove by means of a retainer whereby the margins of said band are spaced from the periphery of said piston for engagement with the internal tank surface thereby to constitute said V-shaped seal.

11. In a tank as set forth in claim 2, said piston having a convex front face in contact with said semisolid material.

12. In a tank as set forth in claim 2, said bearing means being arranged in two circumferential rows around the periphery of the piston, said rows being spaced longitudinally of the piston from one another on the periphery of the piston a distance sufficient effectively to prevent canting of the piston in the tank.

13. In a tank as set forth in claim 2, said tank and said piston each being of circular cross section with said piston being of smaller diameter than the inside diameter of said tank.

14. In a tank as set forth in claim 2, said piston comprising a first cup-shaped portion constituting a forward piston portion having front face for contact with said semisolid material and a second cup-shaped portion constituting a rear portion, said front and rear portions being secured together in back-to-back relation, said front piston portion carrying said sealing means adjacent the forward end thereof.

15. In a tank as set forth in claim 3, said anti-friction bearing means comprising a plurality of spherical balls, said mounting means comprising a plurality of holders, one for each ball, said holders being arranged in two circumferential row on the periphery of the piston, each holder being adapted to receive one of said balls and having means for biasing the ball received thereby outwardly with respect to the piston so as to maintain the ball in engagement with said internal tank surface, to permit said balls to move in and out relative to its respective holder in response to said ball encountering a change in the internal cross section of the tank within said limited range as the piston moves longitudinally within the tank, and to hold the piston against canting.

16. In a tank as set forth in claim 2, said piston comprising a first cup-shaped portion constituting a forward piston portion having a front face for contact with said semisolid material and a second cup-shaped portion constituting a rear portion, said front and rear portions being secured together in back-to-back relation, said front and rear portions each having a side wall constituting the periphery of said piston, each side wall carrying a circumferential row of said antifriction bearing means.

17. In a tank as set forth in claim 16, said front and rear piston portions being made of reinforced plastic material.

18. In a tank as set forth in claim 16, said front face being concave for contact with the semisolid material.

* * * * *

PO-1050
(5/69)

UNITED STATES PATENT OFFICE
CERTIFICATE OF CORRECTION

Patent No. 3,828,988   Dated August 13, 1974

Inventor(s) George R. Berry

It is certified that error appears in the above-identified patent and that said Letters Patent are hereby corrected as shown below:

Front page, item "[73]", "Bervy Inc." should read "Berry, Inc.". Column 8, line 65, "having front" should read "having a front". Column 9, line 7, "row" should read "rows".

Signed and sealed this 7th day of January 1975.

(SEAL)
Attest:

McCOY M. GIBSON JR.
Attesting Officer

C. MARSHALL DANN
Commissioner of Patents